United States Patent Office 3,324,167
Patented June 6, 1967

3,324,167
CONTROL OF ACETALDEHYDE IN THE RECOVERED MONOMERS OF A SHORTSTOPPED COPOLYMERIZATION REACTION OF ACRYLONITRILE AND A VINYL CARBOXYLATE
Thomas M. Veazey and Wayne R. Eberhardt, Decatur, Ala., assignors to Monsanto Company, St. Louis, Mo., a corporation of Delaware
No Drawing. Filed May 14, 1964, Ser. No. 367,545
8 Claims. (Cl. 260—465.9)

This invention relates to a new and improved method of purifying vinyl monomers for use in polymerization reactions and is a continuation-in-part of copending application, Ser. No. 35,429, filed June 13, 1960, now abandoned.

More particularly, this invention relates to the removal of aldehydes from the unreacted vinyl monomers of a shortstopped copolymerization reaction so that the unreacted monomers may be recovered in better condition for use in subsequent polymerization reactions.

One common method of producing polymer from vinyl monomers employs a redox catalyst system in which the activator is a sulfoxy reducing agent such as sodium bisulfite or sulfur dioxide. It has been found that the presence of aldehyde affects the activity of such a catalyst system in a detrimental manner, and that in particular it is difficult to control the molecular weight and specific viscosity of the polymer at a constant level if the aldehyde level varies from batch to batch or, in a continuous system, varies from one time interval to another.

It appears that a complex of the aldehyde-bisulfite type is formed at the expense of the sulfoxy activator, thus reducing the effective catalyst concentration and resulting in a higher specific viscosity polymer than desired.

Trace aldehyde contamination is not a major problem if the polymerization is conducted always with fresh monomer with a constant level of contamination since, for batch polymerization, the quantity of activator added to each repetitious batch can be adjusted to compensate for the known aldehyde level and, for continuous polymerization, the rate of activator addition can be similarly increased to compensate for the aldehyde. However, when the polymerization is shortstopped, i.e., interrupted prior to reaction of all the monomer, and the unreacted monomers are recovered from the reaction products for use in a subsequent polymerization essentially all of the aldehyde originally present will be found in the unreacted monomer fraction. Thus, if 10% of the monomer remains unreacted and is subsequently recovered for reuse, there will be a tenfold increase in the concentration of the aldehyde in the recovered monomer as compared with the original monomer. Over a period of time, the net effect on any system employing recycle of recovered monomer into the fresh monomer feed will be a constantly increasing aldehyde concentration and an increasingly difficult problem of polymer viscosity control.

One major source of aldehyde, and in particular of acetaldehyde, is the impurity present in commercial monomers. Many vinyl monomers are produced commercially by the reaction of acetylene with an appropriate substrate, an example being the addition of acetylene to hydrogen cyanide to produce acrylonitrile. As a side reaction, some of the acetylene reacts with moisture to produce acetaldehyde. Distillation techniques have proved inadequate for the total removal of acetaldehyde from acrylonitrile and all known commercial supplies of acrylonitrile contain measurable quantities of acetaldehyde.

Another source of aldehyde exists when the monomer or at least one of the monomers in a mixed monomer feed is a vinyl carboxylate. The vinyl carboxylates are susceptible to hydrolysis and are particularly sensitive to extremes of pH. The end products of the hydrolysis are acetaldehyde and an acid corresponding to the carboxylate radical originally present. Taking vinyl acetate as an example, hydrolysis occurs at a minimum rate in the pH range of 2.5 to 4.0 and is rapidly accelerated at either higher or lower pH values, the end products of the hydrolysis being equimolar quantities of acetaldehyde and acetic acid. When a sulfoxy agent capable of releasing sulfur dioxide at a low pH is employed as the activator, it may be desirable to distill the unreacted monomers from the reaction residue at a pH higher than 4 to prevent carryover of sulfur dioxide with the recovered monomer. If such conditions are used with the vinyl carboxylates, the hydrolysis rate is increased and additional acetaldehyde produced.

Aldehydes may also be present from other sources and for other reasons. For example, German patent application 1,050,057 teaches the use of various aldehydes, particularly acetaldehyde, propionaldehyde, crotonaldehyde and gylcolaldehyde as shortstopping agents to cause cessation for further polymerization in a reacting system. It is hypothesized that complex formation as described above accounts for the shortstopping action and that thermal dissociation of the complex under distillation conditions accounts for the essentially quantitative recovery of the aldehyde in the recovered monomer fraction.

Previously it was thought that the aldehyde content of the unreacted, recovered monomers could be controlled by treating the recovered monomers with activated charcoal; however, after treating the recovered monomers with activated charcoal and using same in a new polymerization stream, 70 percent fresh plant monomers to 30 percent recovered monomers, it was found that the specific viscosity was not lowered to the acceptable viscosity of about .26, but it actually resulted in an increase in the specific viscosity to about .4. Then the most apparent method for removing aldehyde from the recovered monomers, that of distillation was tried. In the fractionation, essentially all of the aldehyde was concentrated in the first fraction, with only traces of aldehyde in the midcut and tail fractions. An alternative method was to discard the reflux stream in the monomer recovery system. It was determined that in the decanter approximately half of the aldehyde was in the monomer phase and half in the water phase. As the water phase was normally fed back to the recovery column as reflux, the aldehyde was merely being recycled. The water phase was totally discarded which resulted in a considerable reduction in the aldehyde concentration of the recovered monomers. The entire reflux was discarded and the aldehyde content of the recovered monomers was reduced to an acceptable limit. The above methods of controlling the aldehyde were very costly in that a certain amount of monomers was discarded in order to remove or lower the aldehyde to acceptable limits. This disadvantage rendered these methods unacceptable.

An object of this invention is to recover monomers with a low aldehyde content.

Another object of this invention is to prevent hydrolysis of the vinyl esters present in the unrecovered monomers.

Another object is to recover monomers which will not need additional purification prior to reuse in the subsequent polymerization.

Other objects of the invention will be apparent to those skilled in the art from the following more detailed description.

The objects of the present invention are generally accomplished by treating with sodium nitrate the aqueous monomer containing solution of a polymerization reaction in which a redox catalyst system was used, the activator of the redox system comprising a water soluble oxidizable sulfoxy compound in which the valence of a sulfur atom does not exceed 4, followed by steam stripping of the solution in the normal manner to separate the monomers from the aqueous solution. The sodium nitrate effectively oxidizes the aldehyde present and also permits excellent pH control for minimum vinyl ester hydrolysis.

In accordance with the present invention the addition of sodium nitrate is employed to purify the unreacted and unrecovered monomers of the polymerization reaction of those vinyl compounds which undergo addition polymerization to form high molecular weight polymers, by which is meant that a large number of monomer molecules add onto one another to form a large molecule having a predominately linear structure. These vinyl monomers which undergo such polymerization contain the characteristic structure $CH_2=C<$. Examples of this class of monomers include the aryl olefins such as styrene, the chlorostyrene, p-methoxy styrene, alpha-methyl-styrene, vinyl naphthalene and the like; acrylic acid and substituted acrylic acids and their esters, nitriles and amides such as acrylic acids, methacrylic acid, methyl acrylate, ethyl acrylate, isobutyl acrylate, methyl-alpha-chloroacrylate, methyl methacrylate, ethyl methacrylate, butyl methacrylate, ethyl ethacrylate, isoamyl ethacrylate, acrylonitrile, methacrylonitrile, methacrylamide, and the like; methyl isopropenyl ketone, methyl vinyl ether, vinyl ethinyl carbinols, vinylidene chloride, vinyl pyridine, vinyl acetate, vinyl chloride, vinyl furane, vinyl carbazole, furmaric acid esters, dialkyl maleate, vinyl acetylene and esters, alcohols, acids, ethers and the like of the type described.

The sodium nitrate purification agent in this invention is of excellent value in the recovery of substantially pure unreacted monomers when polymerizing a vinyl monomeric material comprising acrylonitrile with one or more other compounds containing the characteristic $CH_2=C<$ group which are copolymerizable therewith, such as, for example, the aryl olefins, particularly styrene, acrylic acid and substituted acrylic acids, esters, and amides, methyl-isopropenyl ketone, vinyl chloride, vinylidene chloride, vinyl acetate and similar compounds and is particularly useful when one of the copolymerizable monomers is a vinyl ester such as vinyl acetate, vinyl butyrate, vinyl valerate, vinyl pelargonate, vinyl stearate, and vinyl laurate. Copolymers of acrylonitrile and any other of the above monomers find particular application in the field of synthetic fibers when composed of at least about 80 percent by weight of acrylonitrile and up to about 20 percent by weight of one or more of the above listed vinyl monomers.

The sodium nitrate purifying agent has been found to be effective in the recovery of substantially pure unreacted monomers of the addition polymerization reaction occurring when the vinyl polymerization materials are subjected to any of the well known methods of polymerization which are catalyzed by the redox catalyst system; those in which a catalyst-activator system is employed containing both an oxidizing and reducing agent in which the activator is a water-soluble oxidizable sulfoxy compound in which the valence of a sulfur atom does not exceed 4. Thus, the polymerization of the above-defined monomeric materials can be carried out in a hetereogeneous system such as an aqueous emulsion or dispersion wherein the monomeric material is dispersed in a suitable liquid such as water, optionally with the aid of a suitable emulsifying agent, and polymerization is effected by adding the redox polymerization catalyst and activator and agitating until the polymer is formed. The purifying agent of the present invention is of particular value in the recovery of substantially pure unreacted monomers of the polymerization reaction where the polymerization is conducted in a homogeneous system as by heating the monomeric material in a suitable solvent in the presence of redox polymerization catalyst-activator system.

The sodium nitrate purifying agent of the present invention is applicable to the recovery of a substantially pure unreacted monomer of a batch polymerization process or a continuous polymerization process. This purifying agent is added to the aqueous solution of unreacted monomers and impurities after the polymerization has been shortstopped and filtered. Also this agent is applicable to the recovery of a substantially pure unreacted monomer of a polymerization reaction carried out in the presence of a redox catalyst system which employs as a catalyst an oxygen liberating compound of the type generally recognized as effective in vinyl polymerization and as an activator a water soluble oxidizable sulfoxy compound in which the valence of a sulfur atom does not exceed 4. In such redox system the catalyst may comprise perborates, perchlorates, persulfates, persulfuric acid and perdisulfates. Likewise the activator may comprise inorganic oxidizable sulfoxy compounds, such as sulfur dioxide, sodium bisulfite, metabisulfite, sodium hydrosulfite and sodium thiosulfate or organic oxidizable sulfur compounds such as dialkyl sulfites, p-toluene sulfinic acids, and formamidine sulfinic acids.

The method of carrying out the present invention consists in adding sodium nitrate to the filtrate of a polymerization reaction, after the reaction has been shortstopped and filtered, but prior to passing the filtrate into the monomer recovery system so that the unreacted monomer will be in contact with the sodium nitrate prior to entry into the recovery system. A convenient point for the sodium nitrate addition is into the filtrate line just ahead of the stripping recovery column feed tank.

The minimum amount of sodium nitrate added to react with the aldehyde to produce the corresponding acid and also maintain the pH sufficiently low (not above about 5 if there are vinyl esters present) so there is not hyrolysis of the vinyl ester which would increase the acetaldehyde content, is 1 chemical equivalent of the amount required to react completely with the aldehyde present as determined by analysis. However, as a practical matter at least 4 chemical equivalents are used. The sulfur dioxide source which would be attacked by subsequent carry over of acetaldehyde in recovered monomers was added to the polmerization reaction initially. These sources are as described hereinbefore, any water soluble, oxidizable, sulfoxy compound in which the valence of a sulfur atom does not exceed 4, such as sulfur dioxide itself, sodium bisulfite, metabisulfite, sodium hydrosulfite, sodium thiosulfate, dialkyl sulfites, p-toluene sulfinic acids, and formamidine sulfinic acid. The use of this sodium nitrate purifying agent gives excellent pH control for minimum vinyl ester hydrolysis as well as reacting with the acetaldehyde already present. Also, the cost of this purifying agent is very low. While an excess of sodium nitrate over that necessary to react with the aldehyde and also maintaining a low pH may be added, it is obvious that larger amounts may be used, but there is no advantage in a large excess, and it only adds to the final cost of the polymer.

It has been pointed out that the present invention is particularly useful in recovering monomers from the shortstopped polymerization of vinyl carboxylates for use in a redox catalyst polymerization because (1) hydrolysis of the vinyl carboxylates is an internal and unavoidable source of aldehyde and (2) aldehyde specifically interferes with the catalytic activity of common redox systems. It will be obvious to those skilled in the art that the present invention is additionally useful whenever it is desired to remove aldehydes, whatever their source, from polymerizable vinyl monomers regardless of the intended subsequent use of the monomers.

In order that those skilled in the art may better understand how the present invention can be carried into effect, the following example is given by way of illustration and not by way of limitation. All parts and percentages are by weight unless otherwise stated.

*Example*

An aqueous solution resulting from a shortstopped and filtered copolymerization reaction of 91 percent acrylonitrile and 9 percent vinyl acetate was obtained. To this solution was added 4.8 times the chemical equivalent amount of sodium nitrate required to react completely with any acetaldehyde present in the solution. It was determined that the original concentration of acetaldehyde was 5.31 percent. The addition of the sodium nitrate decreased this value to 1.28 percent, removing 76 percent of the acetaldehyde present in the solution. The pH of the solution was maintained at about 4.

What is claimed is:

1. A method of treating recovered monomers of a shortstopped copolymerization reaction of acrylonitrile and vinyl carboxylates of a redox catalyst system in which the activator comprises a water soluble, oxidizable, sulfoxy compound in which the valence of a sulfur atom does not exceed 4, said recovered monomers being those monomers which contain acetaldehyde, comprising controlling the amount of said acetaldehyde by treating the acetaldehyde-containing monomers of the shortstopped copolymerization reaction with sodium nitrate.

2. The method of claim 1 wherein the vinyl carboxylate is vinyl acetate.

3. The method of claim 1 wherein the copolymerization reaction is of at least about 80 percent acrylonitrile and up to about 20 percent of vinyl acetate.

4. A method of controlling the amount of acetaldehyde in the recovered monomers of a shortstopped copolymerization reaction of acrylonitrile and a vinyl carboxylate of a redox catalyst system in which the activator comprises a water soluble, oxidizable, sulfoxy compound in which the valence of a sulfur atom does not exceed 4, said recovered monomers being those monomers having therein acetaldehyde, comprising maintaining pH of the vinyl monomer solution at about 4, treating this unreacted monomer solution with 4.8 equivalents of sodium nitrate based upon the amount of acetaldehyde present in the unreacted monomer solution prior to the beginning of the monomer recovery process of the unreacted vinyl monomer solution.

5. The method of claim 4 wherein the vinyl carboxylate is vinyl acetate.

6. The method of claim 4 wherein the copolymerization reaction is of at least about 80 percent acrylonitrile and up to about 20 percent vinyl acetate.

7. The method of controlling the amount of acetaldehyde present in the recovered monomers of a monomer recovery system of a shortstopped copolymerization reaction of at least 80 percent acrylonitrile and up to 20 percent of vinyl acetate of a redox catalyst system which the activator comprises a water soluble, oxidizable, sulfoxy compound in which the valence of a sulfur atom does not exceed 4, comprising maintaining the pH of the solution at about 4, treating this unreacted monomer solution with 4.8 equivalents of sodium nitrate based upon the amount of acetaldehyde present in the unreacted monomers solution, prior to the starting of the monomer recovery process of the unreacted acrylonitrile and vinyl acetate monomer solution.

8. The method of claim 7 in which the vinyl monomers are 91 percent acrylonitrile and 9 percent vinyl acetate.

No references cited.

CHARLES B. PARKER, *Primary Examiner.*

J. P. BRUST, *Assistant Examiner.*